W. H. P. GOULD, Jr.
PLANT SETTING MACHINE.
APPLICATION FILED AUG. 23, 1920.
1,376,933.
Patented May 3, 1921.
3 SHEETS—SHEET 1.
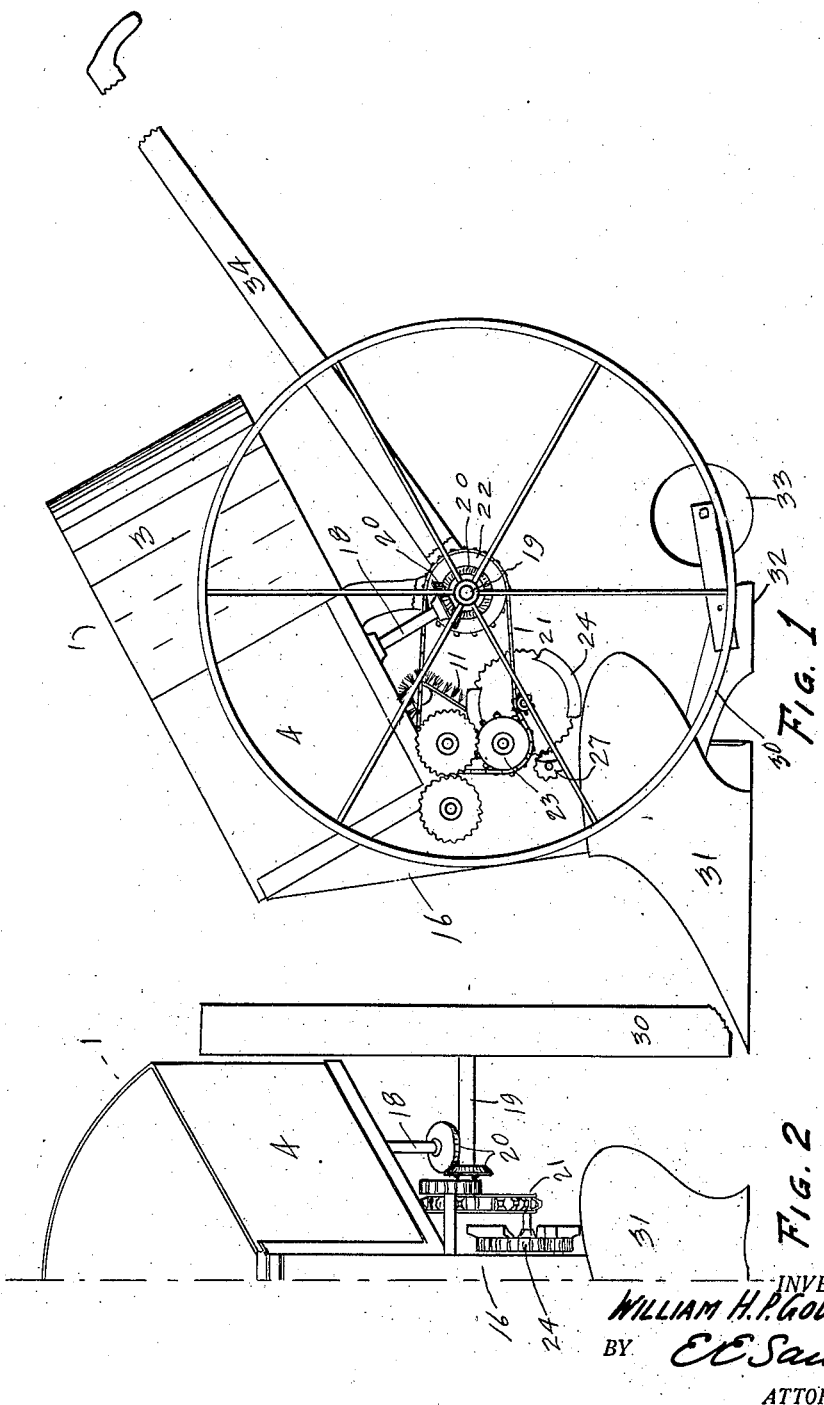
INVENTOR
WILLIAM H. P. GOULD JR.
BY
ATTORNEYS.

W. H. P. GOULD, Jr.
PLANT SETTING MACHINE.
APPLICATION FILED AUG. 23, 1920.
1,376,933.
Patented May 3, 1921.
3 SHEETS—SHEET 2.
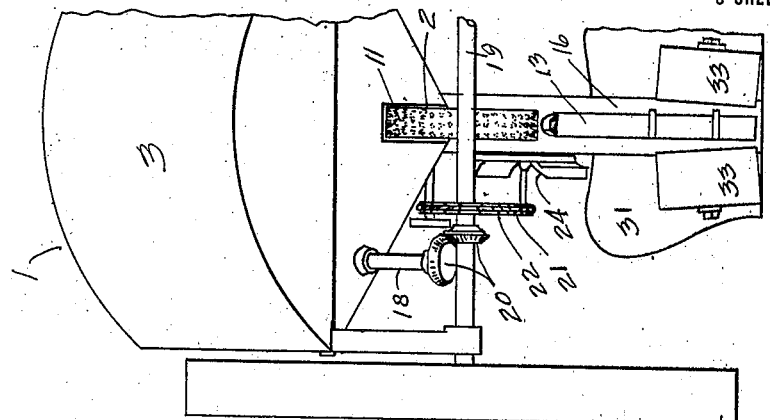
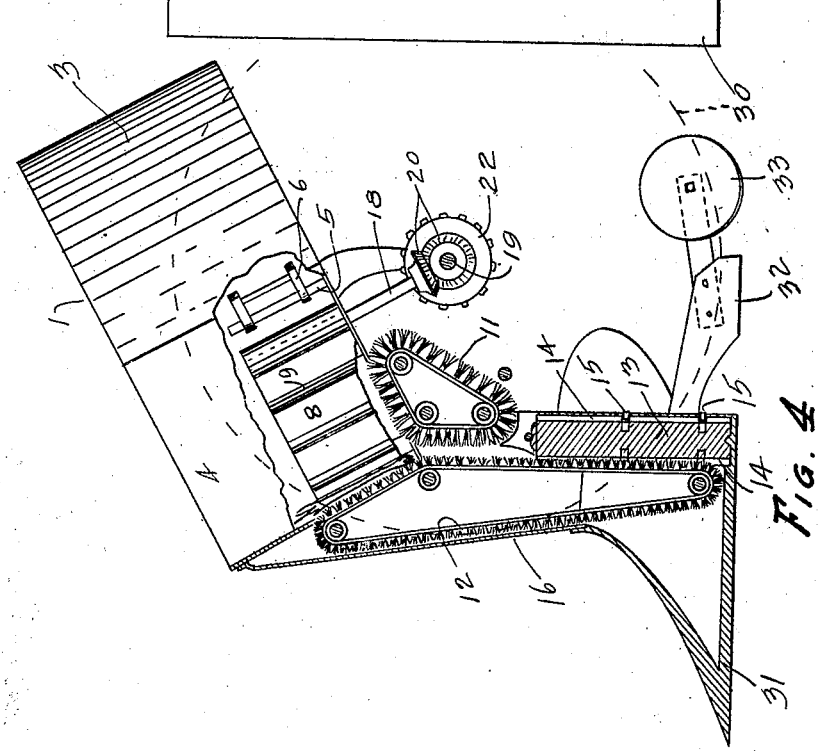
INVENTOR.
WILLIAM H. P. GOULD JR.
BY E. E. Sauzé
ATTORNEYS.

W. H. P. GOULD, Jr.
PLANT SETTING MACHINE.
APPLICATION FILED AUG. 23, 1920.
1,376,933.
Patented May 3, 1921.
3 SHEETS—SHEET 3.
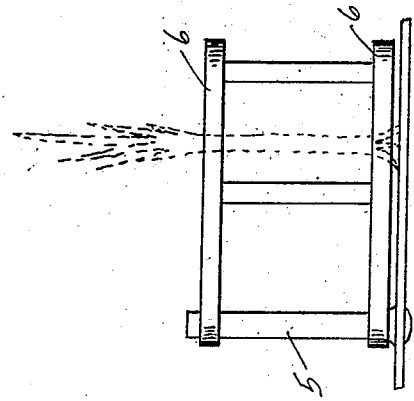
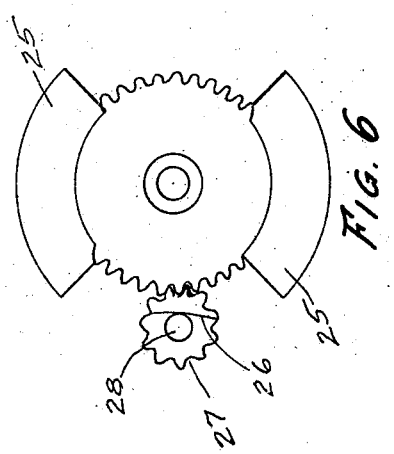
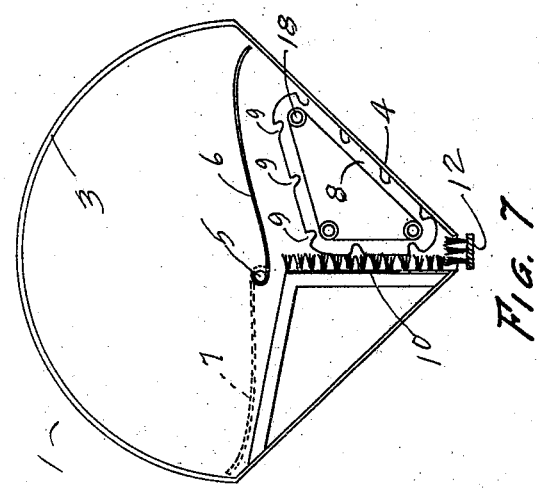
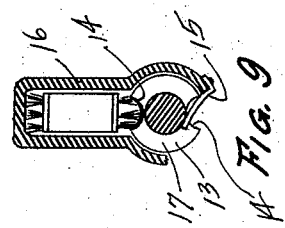
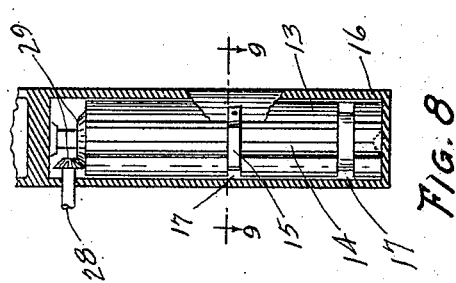
INVENTOR.
WILLIAM H. P. GOULD JR.
BY E. E. Saugé
ATTORNEYS.

UNITED STATES PATENT OFFICE.

WILLIAM H. P. GOULD, JR., OF WALLA WALLA, WASHINGTON.

PLANT-SETTING MACHINE.

1,376,933.  Specification of Letters Patent.  Patented May 3, 1921.

Application filed August 23, 1920. Serial No. 405,396.

*To all whom it may concern:*

Be it known that I, WILLIAM H. P. GOULD, Jr., a citizen of the United States, residing at Walla Walla, in the county of Walla Walla and State of Washington, have invented certain new and useful Improvements in Plant-Setting Machines, of which the following is a specification.

This invention relates to gardening machines, such as are used for setting out young plants, and is particularly applicable to setting young onions.

One object of my invention is to provide a machine which will automatically separate one plant at a time from a number and deposit the plants at regular intervals in a furrow, and in combination with the usual coverers and covering rolls to properly plant the row.

Another object of my invention is to provide a machine which will utilize standard parts of the present cultivators, planters, etc., and thus provide a machine of low cost.

With these and other objects in view my machine embodies essentially a positive means for taking an individual plant from a quantity, depositing it positively in the ground and properly covering it, and of operating with great rapidity.

That the invention may be better understood reference is now had to the accompanying drawings in which—

Figure 1 is a side elevation of the device;

Fig. 2 is a half front elevation;

Fig. 3 is a partial rear elevation;

Fig. 4 is a sectional side elevation;

Fig. 5 is an enlarged side elevation of the automatic yielding feeder arm;

Fig. 6 shows a pair of gears used for transmitting an intermittent motion to the core;

Fig. 7 is a plan view of the feeder hopper;

Fig. 8 is a side elevation of the core and its case, the case being in section, and showing the plant ejectors; and Fig. 9 is a section of the core on the line 9—9 of Fig. 8.

Having reference to the drawings, like numerals refer to like parts throughout, and the numeral 1 refers to the hopper which consists of a receptacle having a flat bottom in which is a slot 2 which I will term an orifice as the main portion of this slot is closed by a movable brush belt, to be presently explained, leaving a small opening through which the plant passes. The hopper is preferably inclined and its upper portion is curved, as shown at 3, while its lower portion is formed with straight sides, as at 4. Within the feeder hopper is a post 5 carrying a feeder arm 6 made of spring material so that it may be brought to the position shown by the dotted lines 7 in Fig. 7.

Operating within the straight sides of the hopper is a flexible belt 8 which is provided with laterally positioned plant bearing grooves 9 spaced equidistant throughout the length of the belt.

Positioned centrally in the hopper is a stationary brush 10 against which a portion of the flexible belt 8 contacts.

Beneath the hopper and operating in the above mentioned slot 2 is a brush belt 11 which operates below the contacted portions of the flexible belt and the stationary brush. This brush belt travels vertically downward toward a core and coöperates with a second brush belt 12 to move the plant from the hopper; this second brush belt being positioned operably in front of the hopper and entering the hopper at a point slightly above the flexible belt and stationary brush to rub the plant downward toward the core 13.

The core 13 consists of a circular piece of material in which are longitudinal grooves 14 in which the plants are finally deposited before planting.

To provide proper ejection of the plant at the proper time I use ejectors 15 which are attached to the case 16 (or frame) and project inward, engaging a groove 17. By this means each half rotation of the core carries a plant against the ejectors, which diverts them from being carried completely around.

The flexible belt 8 is preferably constructed on its inner side like a sprocket chain and is driven by the shaft 18 which in turn is driven by the axle 19 through the bevel gears 20.

The brush belt 11 may be of similar sprocket chain construction and is driven by the chain 21 from the axle 19 by means of the sprocket wheels 22 and 23 respectively.

The chain 21 also drives the mutilated gear 24 to rotate the core 13 and to impart an intermittent motion thereto which is accomplished by means of the stops 25 (see Fig. 6) which engage the shoulder 26 of the pinion 27. This motion being old in the art, further description is deemed unnecessary. The pinion is attached to a stub shaft 28 and drives the core through the bevel gears 29.

The usual wheels 30 are provided, and these with the plow 31, the coverers 32, the covering rolls 33, handles 34, sprocket chain 21, and some of the gears, are of the usual stock sizes and shapes.

A clutch of the usual type may be used to prevent a backward motion to the mechanism when withdrawing the machine from or to the field.

In use the feeder arm 6 is brought to the position shown by the dotted lines 7 and the curved end of the hopper is filled with plants, with their roots altogether and resting on the bottom of the hopper. The motion of the machine forward moves the flexible belt 8, the lateral grooves 9 therein grasping the plants which are forced against the flexible belt by the feeder arm. The brush belt 11 now acts on the roots of the plant to assist the flexible belt to carry the plant to the lower part of its travel where the second brush belt 12 coöperating with the brush belt 11 now draws the plant downward to and into the groove in the core. The core now functions intermittently to make one half a revolution and stop; this gives sufficient time for the next plant to reach the lowest part of the groove before the next movement of the core. At each half revolution the plant comes in contact with the ejectors which are set to expel the plant at the completion of the half revolution of the core.

It is now obvious that the movement of the flexible belt, the brush belt, the second brush belt, and the core must be synchronized with the movement of the wheels 30, however by changing the size of sprocket 22 and gears 20 the plants may be dropped at any predetermined distance.

Having now described my invention, I claim:

1. In a wheeled plant setting machine, a feeder hopper provided with a discharge orifice, a feeding mechanism within said hopper, movable brush belts oppositely positioned beneath said discharge orifice, a vertically positioned core rotatably mounted beneath said feeder hopper and provided with longitudinal grooves, and a means for driving the mechanism of said plant setting machine synchronizedly, in combination with a plow, coverers, and covering rolls.

2. In a wheeled plant setting machine a feeder hopper, feeding mechanism within said hopper, a flexible belt operably mounted within said hopper, and provided with plant carrying grooves, a means for operating said flexible belt, a stationary brush within said hopper and positioned to contact a portion of said flexible belt, a brush belt operably mounted beneath the contact portion of said flexible belt and stationary brush, a second brush belt operably mounted and positioned opposite of the flexible belt, the stationary brush, and the first mentioned brush belt, a means for driving said brush belt, a vertically positioned core rotatably mounted beneath said feeder hopper and carrying longitudinal grooves, a means for intermittently rotating said core, ejectors operably mounted against said core, a means for driving the mechanism of said plant setting machine synchronizedly, said core being positioned to discharge behind a plow, and the whole in combination with a plow, coverers, and covering rolls.

3. In a plant setting machine, an inclined feeder hopper, provided with a discharge orifice, an automatic yielding feeder arm within said hopper, a flexible belt operably and perpendicularly mounted on the bottom of said hopper, and provided with laterally disposed plant carrying grooves, a means for driving said flexible belt, a stationary brush within said hopper and positioned to contact said flexible belt, a brush belt operably mounted beneath the contact portion of said flexible belt and stationary brush, a second brush belt operably mounted ahead of the flexible belt, and ahead of the first mentioned brush belt, a means for driving both of said brush belts, a vertically positioned core rotatably mounted beneath said feeder hopper and carrying longitudinal grooves, one of said grooves normally registering with said second brush belt, a means for intermittently rotating said core, stationary ejectors operably positioned against said core, a means for driving the mechanism of said plant setting machine synchronizedly and from the axle thereof, said core being positioned to discharge behind a plow, and the whole in combination with a plow coverers, and covering rolls.

4. In a wheeled plant setting machine, an inclined feeder hopper, provided with a discharge orifice, an automatic yielding feeder arm operably mounted within said hopper, a flexible belt operably mounted within said hopper and provided with laterally disposed plant carrying grooves, a means for driving said flexible belt, a stationary brush within said hopper and positioned to contact a portion of said flexible belt, a brush belt operably mounted beneath the contact portion of said flexible belt, and stationary brush, a means for driving said brush belt, a second brush belt operably mounted ahead of the flexible belt, and ahead of the first mentioned brush belt, a means for driving said second brush belt, a vertically positioned core rotatably mounted beneath said feeder hopper and carrying longitudinal grooves, one of said grooves normally registering with said second brush belt, a means for intermittently rotating said core, ejector, operably positioned against said core and a means for driving the mechanism of said plant setting machine synchronizedly and from the axle thereof.

In testimony whereof I affix my signature.

WILLIAM H. P. GOULD, Jr.